United States Patent [19]

Sasaki

[11] 4,402,481

[45] Sep. 6, 1983

[54] ARTICULATED DEVICE FOR SERVICE COMPONENT

[75] Inventor: Hiroshi Sasaki, Tokyo, Japan

[73] Assignee: Mitutoyo Mfg. Co., Ltd., Tokyo, Japan

[21] Appl. No.: 346,021

[22] Filed: Feb. 5, 1980

[30] Foreign Application Priority Data

Feb. 27, 1981 [JP] Japan .................................. 56-27896

[51] Int. Cl.³ .............................................. E04G 3/00
[52] U.S. Cl. .................................... 248/276; 248/122; 248/DIG. 4; 403/55
[58] Field of Search .............. 248/122, 124, 274, 276, 248/278, 288.5, 160, 480, 291, DIG. 4; 403/56, 90, 55

[56] References Cited

U.S. PATENT DOCUMENTS 3,240,516  3/1966  Barish et al. .......................... 403/90
3,910,538 10/1975  Baitella ........................... 248/276 X
4,320,884  3/1982  Led .................................... 248/276

FOREIGN PATENT DOCUMENTS 608874 11/1979 Switzerland ........................ 248/276

Primary Examiner—J. Franklin Foss
Attorney, Agent, or Firm—Koda and Androlia

[57] ABSTRACT

An articulated device for a service component, wherein a front arm and a rear arm, each provided at one end with an engageable member, are rotatably connected to each other by a transmitting shaft slidably coupled into the enggeable members, the transmitting shaft is provided with tapered portions opposed to the arms, the engageable members incorporate therein balls engaging the tapered portions, the arms incorporate therein rods slidable in the lengthwise directions thereof and abutting against the balls, and the rod in the front arm is actuated to cause the transmitting shaft to axially move through the agency of the balls, whereby the engageable members are pressed against and engaged with each other, so that the arms can be fixed at certain angles.

8 Claims, 7 Drawing Figures

ARTICULATED DEVICE FOR SERVICE COMPONENT

BACKGROUND OF THE INVENTION

1. Field of the Invention

This invention relates to articulated devices for service components, and particularly to an articulated device for holding a measuring instrument, a flood light source, a medical equipment or the like (hereinafter referred to as the "service component"), so that the service component can be freely set at a desirable position.

There has been known, as the articulated device for the service component as described above, one having a construction, in which at least two arms relatively adjustable in angle are connected to each other by means of angle fixing means adjustable in angle. There are disclosed the conventional constructions of the articulated devices for the service components in U.S. Pat. Nos. 32,405,165 and 3,910,538 (corresponding to Japanese Patent Application "Kokai" (Laid-Open) No. 16563/75) for example.

2. Description of the Prior Art

The conventional articulated device of the type described above has two arms relatively different in angle and the angle fixing means therefor is provided at the connecting portion of the two arms, and hence, is disadvantageous in the following respects.

Namely, during operation of angle fixing, the service component secured to one of the arms is shaken with respect to a base frame to which the other of the arms is fastened, whereby it is difficult to set the service component at a desirable position at a stroke. More specifically, connecting portions for adjusting the angle are provided on the arms, respectively, and it is necessary to separately adjust the connecting portions, and hence, the conventional articulated device has been disadvantageous in that, each time the angle fixing means are tightened, the service components have been shaken. Because of this, there has been presented the disadvantage that the degree of freedom in selecting the position where the service component is set with respect to the base frame.

Further, in order to adopt a multi-step articulated mechanism having three or more arms, it is necessary to provide angle fixing means at least two positions. Because of this, at the time of tightening during angle fixing operation, the shaking of the service component is further increased, thereby reducing the practical value.

SUMMARY OF THE INVENTION

The present invention has been developed to obviate the above-described disadvantages of the prior art and has as its object the provision of an articulated device for a service component, wherein a relative angle between two or more arms can be fixed by means of an angle fixing means by a stroke, and moreover, even if a position, where the angle fixing means is to be fastened, is not particularly defined, an angle adjusting operation can be easily performed.

More specifically, the present invention contemplates to provide an articulated device for a service component, characterized in that a front arm and a rear arm, each of which is provided at one end with an engageable member, are rotatably connected to each other by a transmitting shaft slidably coupled into the respective engageable members, the transmitting shaft is provided thereon with tapered portions opposed to the arms, the respective engageable members receive therein balls engageable with the tapered portions, the respective arms each receive therein a rod slidable in the longitudinal direction thereof and abutting against the balls being opposed thereto, the rod in the front arm is actuated to move the transmitting shaft in the axial direction thereof through the agency of the balls, whereby the respective engageable members are pressed against and engaged with each other, so that the respective arms can be fixed at certain angles.

The present invention contemplates to provide as another embodiment an articulated device for a service component, characterized in that:

the articulated device comprises a support arm provided at one end with a clamp member and solidly secured at the other end to a bed frame, a front arm incorporating therein an axially slidable rod and provided at opposite ends thereof with engageable members, a working shaft axially movably coupled into the clamp member and the engageable member, connected at one end thereof with a control knob and provided at the other end with a tapered portion, a rear arm incorporating therein an axially slidable rod, provided at one end thereof with an engageable member and secured at the other end with a mount member for mounting a service component, a transmitting shaft axially slidably coupled into the engageable members of both the front and rear arms and provided at opposite ends thereof with tapered portions, service component mount member tightening means provided at the forward end portion of the rear arm and adapted to be tightened or loosened by the axial movement of the rod in the arm, and falls received in the respective engageable members in a manner to the engageable with the end faces of the respective rods opposed thereto and the tapered portions also opposed thereto; and the working shaft is actuated by means of the control knob, whereby the respective rods are actuated, so that the service component mounted on the service component mount member can be set at a desirable position.

In this case, at least an additional arm substantially identical in construction with the front arm is interposed between the front and rear arms to increase a step in the articulation construction, so that the degree of freedom in the positions, where the service component is set, can be improved.

DESCRIPTION OF THE PREFERRED EMBODIMENTS

Description will hereunder be given of the embodiments of the present invention with reference to the drawings.

Figure 1:
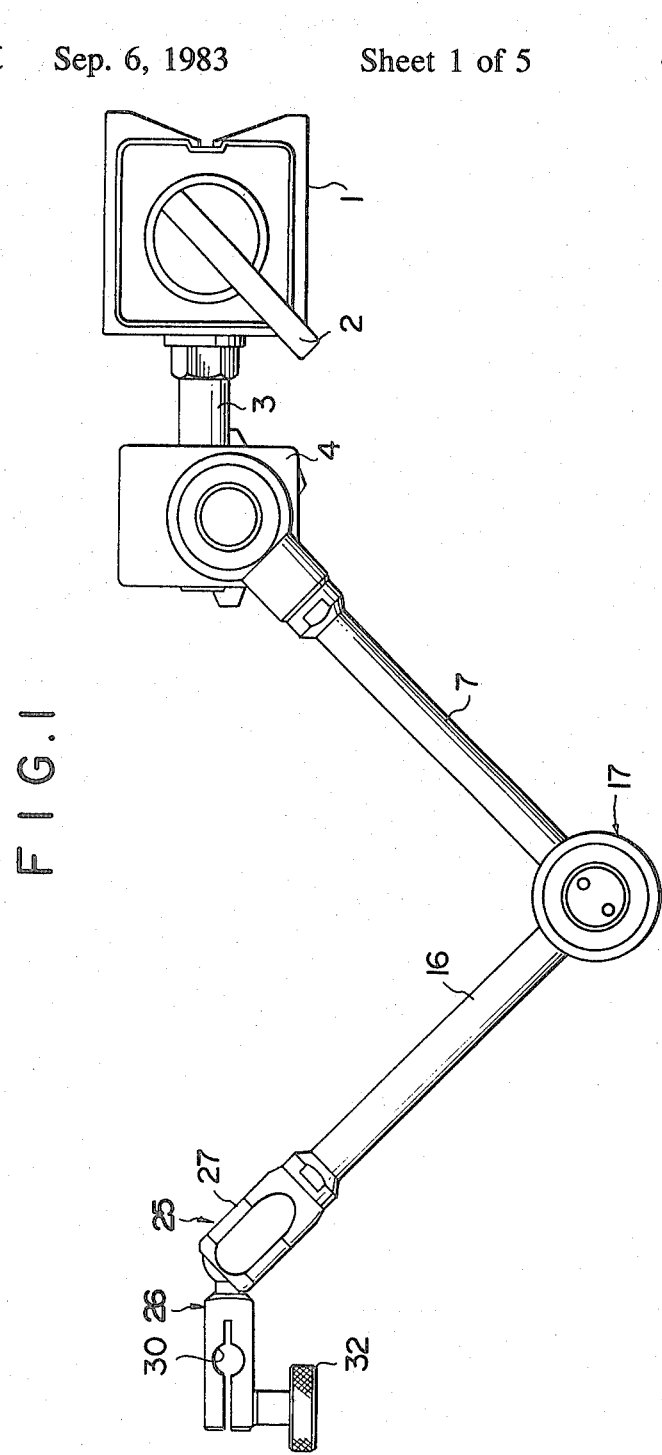
FIG. 1 is a plan view of an embodiment of the articulated device for a service component according to the present invention.
Figure 2:
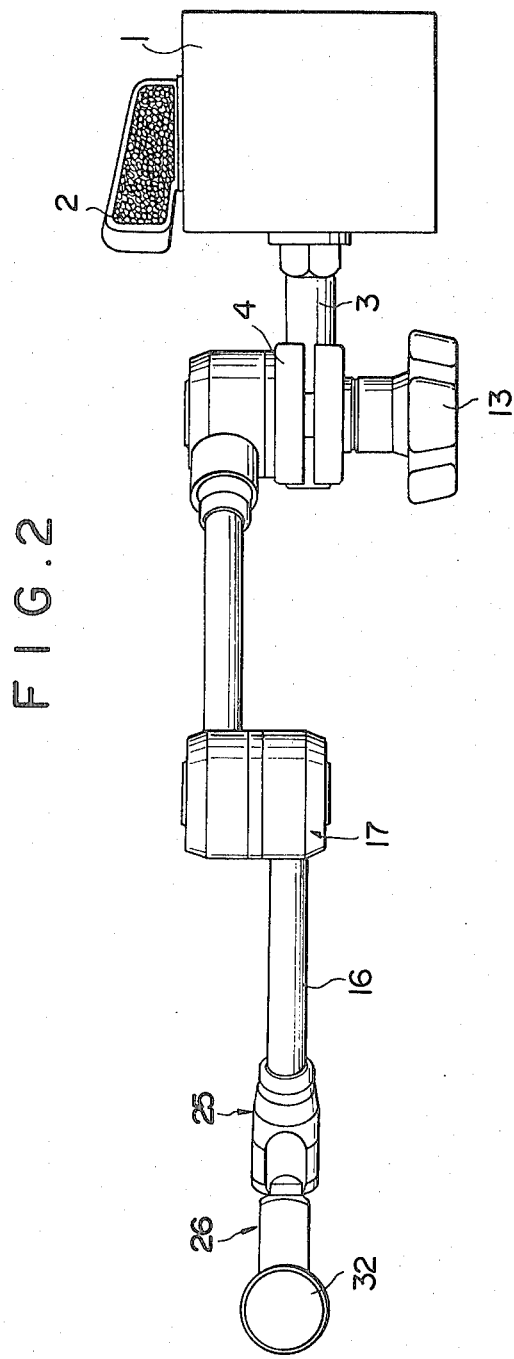
FIG. 2 is a side view of the articulated device shown in FIG. 1.
Figure 3:
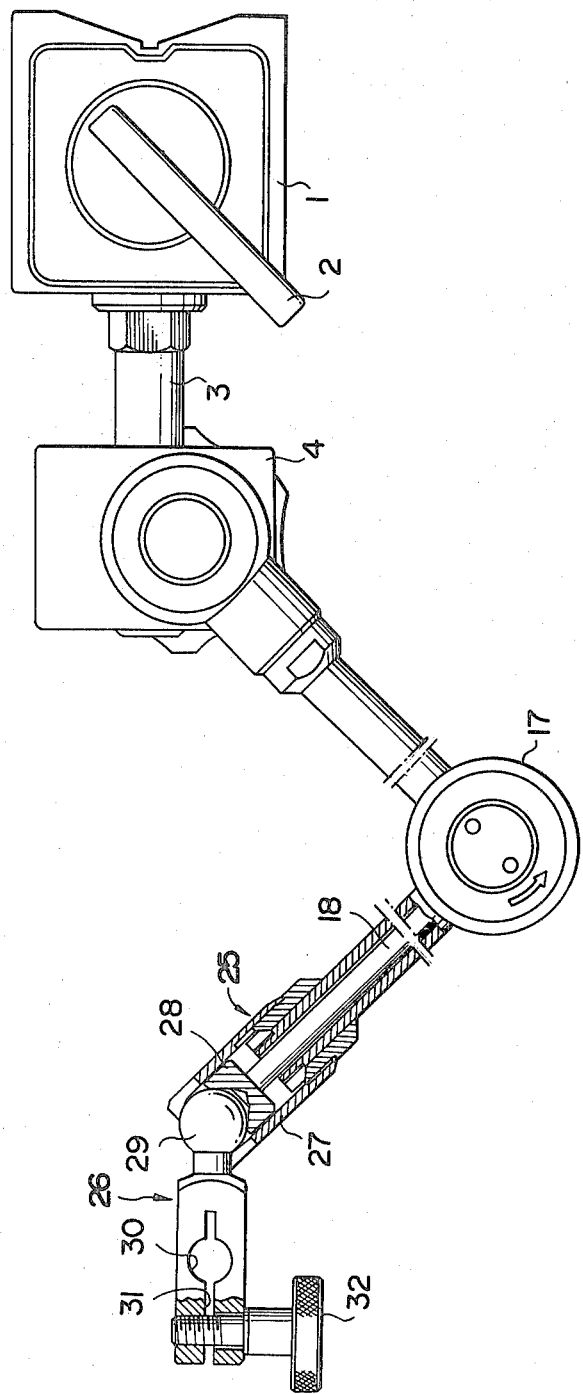
FIG. 3 is an enlarged plan view, partially sectional, of the articulated device shown in FIG. 1.
Figure 4:
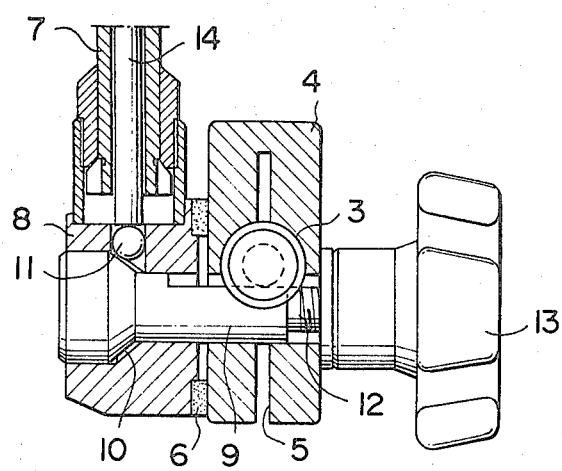
FIG. 4 is a partially sectional view taken along the line IV—IV in FIG. 3.
Figure 5:
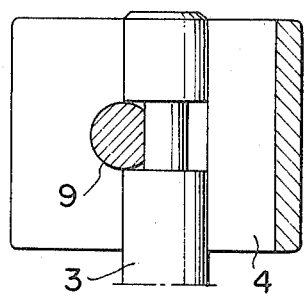
FIG. 5 is a partially sectional view taken along the line V—V in FIG. 4.
Figure 6:
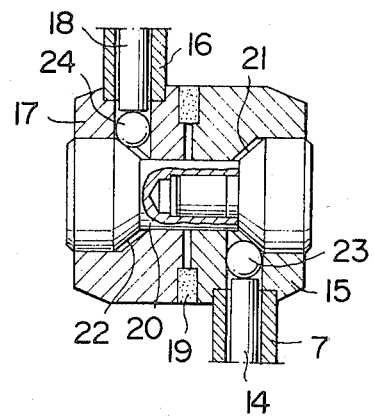
FIG. 6 is a partially sectional view taken along the line VI—VI in FIG. 3.

Referring to FIGS. 1 through 3, a base frame 1 for affixing the articulated device as a whole onto a stool for example. This base frame 1 is affixed onto the surface of the stool by the magnetic attractive force of a magnet vertically movable in the base frame by means of a lever 2 for example. Solidly secured to the base frame 1 is a support arm 3, the other end of which is secured to a clamp member 4. This clamp member 4 is provided therein with a slot groove 5 as shown in FIG. 4, whereby the clamp member is compressed from opposite sides to be elastically deformed, so that the support arm 3 can be fixed at a desirable position within its circumferential scope of 360°. An engageable member 8 for the front arm 7 is provided at one side of the clamp member 4 through a friction material 6. A working shaft 9 is axially slidably coupled into the clamp member 4 and the engageable member 8. This working shaft 9 is formed at the forward end portion thereof with a tapered portion 10, with which is engaged a ball 11 received in the engageable member 8. Additionally, connected to the other end of the working shaft 9 is a control knob 13 through a threaded portion 12. Consequently, the control knob 13 is rotated to move the working shaft 9 to the right in FIG. 4, so that the clamp member 4 can be fixed to a position at a predetermined angle relative to the support arm 3.

The front arm 7 incorporates therein an axially movable rod 14, one end of which is engaged with the ball 11 as shown in FIG. 4.

Another engageable portion 15 is provided at the other end of the front arm 7. Additionally, an engageable portion 17 is also provided at an end portion of a rear arm 16 connected to this front arm 7 in a manner to be adjustable in relative angle. This rear arm 16 also incorporates therein an axially movable rod 18. And, the engageable member 15 of the front arm 7 and the engageable member 17 of the rear arm 16 are contiguous to each other through a friction material 19 and connected to each other through a transmitting shaft 20 axially movably coupled into the engageable members 15 and 17. This transmitting shaft 20 is formed at opposite end portions thereof with tapered portions 21 and 22. One 21 of the tapered portions is received in the engageable portion 15 and engaged with a ball 23 engaging the end face of the rod 14 incorporated in the front arm 7. While, the other 22 of the engageable portion is engaged with a ball 24 engaging the end face of the rod 18 incorporated in the rear arm 16.

Secured to the other end of the rear arm 16 through service component mount member tightening means 25 is a service component mount member 26. This service component mount member tightening means 25 has a ball joint construction constituted by a case 27 solidly secured to an end portion of the rear arm 16, a receiving seat 28 secured to the forward end portion of the rod 18 and a ball 29 at the side of the service component mount member 26. When the rod 18 moves in the axial direction thereof, this tightening means 25 pushes the ball 29 against the inner surface of the case 27 through the receiving seat 28, so that the service component mount member 26 can be fixed to a position at a predetermined angle. Any one of various service components can be mounted on the service component mount member 26, including a measuring or instrumentation component, a flood light source, medical equipment, or the like. For example, this service component mount member 26 is provided with a hole 30 for mounting a dial guage or the like and a tightening screw 32 for tightening and fixing the service component, such as a dial gauge coupled into the hole 30 through tightening a portion of a groove 31 communicated with outside through the hole 30.

In operation, a suitable service component such as a dial gauge is first tightened and fixed to the service component mount member 26. Next, the aforesaid control knob 13 is rotated in the direction of return to restore the ball 11 to the lower positions in the tapered portions of the working shaft 9 and the transmitting shaft 20, whereby the respective engageable membes are loosened to allow the joint portions to be movable. In this conditions, the service component is brought to a predetermined position manually or in another manner. Upon ascertaining that the service component is at the predetermined position, the control knob 13 is rotated in the direction of tightening. By this rotation in the tightening direction, the aforesaid service component is stationarily set at the predetermined position. More specifically, there are simultaneously carried out in a stroke tightening and fixing the clamp member 4 to the support arm 3, pressing and fixing of the clamp member 4 to the engageable member 8 by the axial movement of the working shaft 9, pressing and fixing of the engageable member 15 to the engageable member 17 by the axial movement of the transmitting shaft 20 due to the axial movement of the rod 14 (i.e., an angle fixing between the front and rear arms 7 and 16), and an angle fixing of the service component mount member 26 by the service component mount member tightening means 25 due to the axial movement of the rod 18.

In the articulated device for a service component with the above-described arrangement, embodying the present invention, only the operation of an angle fixing means (the angle fixing means at the portion having the control knob 13) makes it possible to easily and reliably fix a relative angle between two or more arms (the front arm 7, the rear arm 16 and the like) at a stroke. An operator can operate the control knob 13, which is the angle fixing means, in one hand, while holding the service component in the other hand, whereby shaking or the like at the time of positioning the service component does not occur at all, so that the service component can be easily and reliably set at a predetermined position. Unlike in the prior art, an assistant operator and an auxiliary jig for preventing the shake are not needed, thereby enabling to provide an articulated device highly economical and excellent in workability.

Further, the position, where the angle fixing means is fastened, is not particularly limited, whereby the position of the angle fixing means can be freely selected at a position adjacent the base frame 1, so that the positioning of the aforesaid service component can be easily and reliably carried out.

Additionally, the degree of freedom in positioning the service component with respect to the base frame 1 can be increased to a considerable extent as compared with the conventional articulated device of the type described. This is because of the construction in which the clamp member 4 can rotate through 360° with respect to the support arm 3, and further, the front arm 7 can freely rotate through 360° with respect to the working shaft 9.

Figure 7:
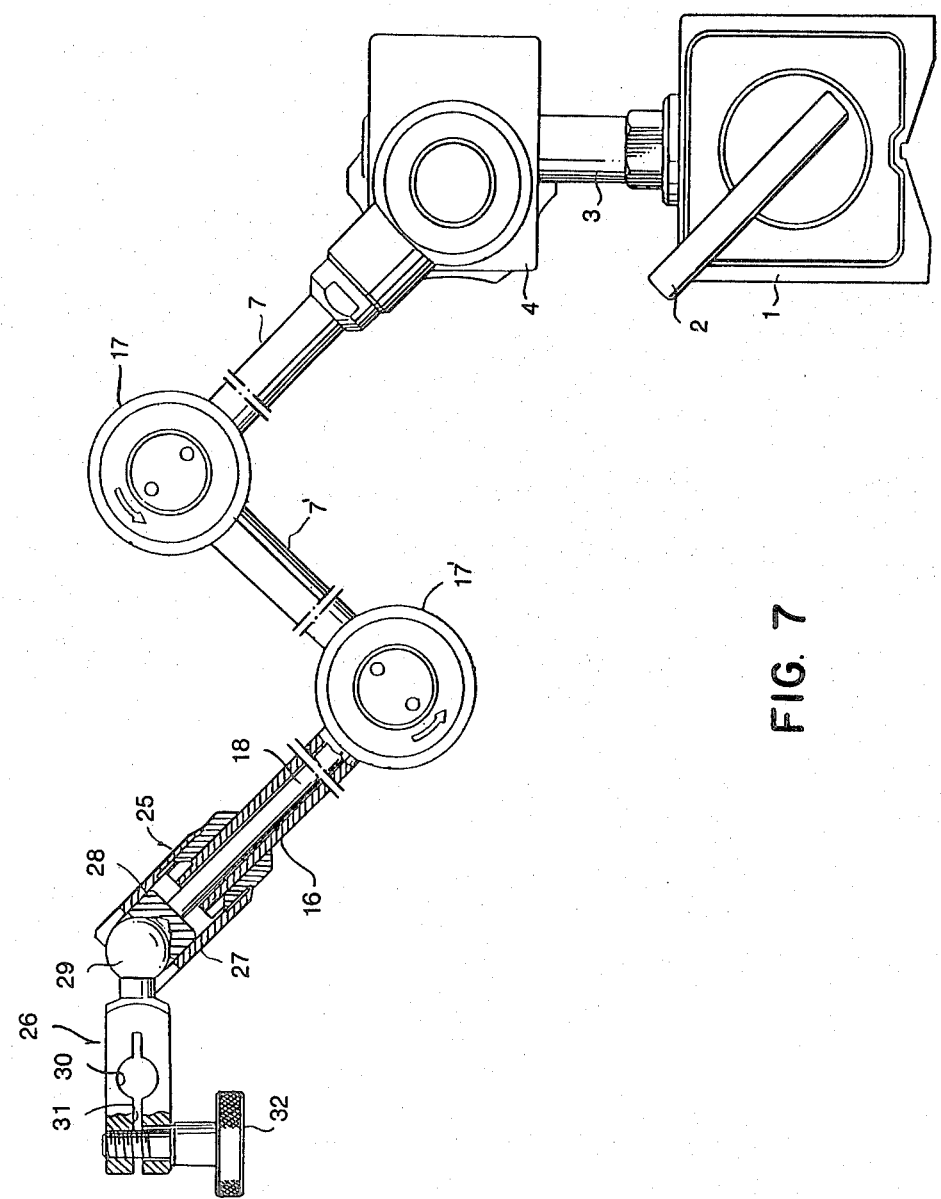
FIG. 7 is a plan view of a second embodiment of an articulated device in accordance with the teachings of the present invention.

In the above-described embodiment, description has been given to the case where there are provided two arms including the front arm 7 and the rear arm 16, however, a step or steps in the articulation construction may be desirably increased by interposing an additional arm 71 substantially identical in construction with the front arm 7 between the front arm and the rear arm and another engageable member 17' substantially identical in construction to engageable member 17 as shown in FIG. 7. More specifically, one or more additional 7' arms substantially identical in construction with the front arm in a suitable number are interposed between the front and rear arms together with one or more engageable members 17' to desirably work a multiple articulation construction, and, even in this case, only the operation of an angle fixing means (the fixing means having the control knob 13) can set the service component mount member at a predetermined position at a stroke, thereby enabling to achieve the functional effects identical with those attained by the embodiment shown in the drawing.

As has been apparently known from the foregoing, according to the present invention, an articulated device for a service component is obtainable, in which the service component can be set at a position more easily and accurately carried out than the device of the prior art.

What is claimed is:

1. An articulated device for a service component having a clamp member for mounting said device on a base and a service component mount member for mounting a service component, comprising:
   (a) a front arm connected to the clamp member;
   (b) a rear arm connected to the service component mount member;
   (c) a first engageable member connected to said front arm;
   (d) a second engageable member connected to said rear arm;
   (e) a first rod incorporated in said front arm, said first rod being slidable in longitudinal direction of said first rod;
   (f) a second rod incorporated in said second arm, said second rod being slidable in longitudinal direction of said second rod;
   (g) a transmitting shaft rotatably connecting said first and second engageable members with each other, said transmitting shaft being provided with tapered portions opposite to ends of said first and rear rods, said transmitting shaft being movable across said first and second engageable members;
   (h) a first ball arranged in said first engageable member between said tapered portion and the end of said first rod;
   (i) a second ball arranged in said second engageable member between said tapered portion and the end of said second rod; and
   (j) actuating means for actuating said first rod toward said first engageable member, whereby, when said first rod is actuated toward said first engageable member, said transmitting shaft is axially moved by said first ball pressing said tapered portion to fix said front and rear arms at certain angle.

2. An articulated device for a service component as set forth in claim 1, further comprising additional arms having transmitting means for transmitting a movement in longitudinal direction of said first rod to said second rod, said additional arms being interposed between said front arm and said rear arm.

3. An articulated device for a service component as set forth in claim 1, wherein said base includes a magnet for fixing said base.

4. An articulated device for a service component as set forth in claim 2, wherein said base includes a magnet for fixing said base.

5. An articulated device for a service component comprising:
   (a) a support arm provided at one end thereof with a clamp member and solidly secured at the other end to a base frame;
   (b) a front arm incorporating therein an axially slidable rod and provided at opposite ends thereof with engageable members;
   (c) a working shaft axially movably coupled into said clamp member and said engageable member, connected at one end thereof with a control knob provided at the other end thereof with a tapered portion, said working shaft being actuated by said control knob;
   (d) a rear arm incorporating therein an axially slidable rod, provided at one end thereof with an engageable member and provided at the other end with a service component mount member through tightening means for fixing an angle between said service component mount member and said rear arm;
   (e) a transmitting shaft axially slidably coupled into the engageable members of said front and rear arms and provided with tapered portions opposite to end of said front and rear arms; and
   (f) balls received in said engageable members in a manner to engage the end faces of the rods opposed thereto and the tapered portions opposed thereto, whereby when said rods are actuated, said service component mount member, said front arm and said rear arm are fixed at certain angle.

6. An articulated device for a service component as set forth in claim 5, further comprising additional arms having transmitting means for transmitting a movement in longitudinal direction of said first rod to said second rod, said additional arms being interposed between said front arm and said rear arm.

7. An articulated device for a service component as set forth in claim 5, wherein said base frame includes a magnet for fixing said base.

8. An articulated device for a service component as set forth in claim 6, wherein said base frame includes a magnet for fixing said base.

* * * * *

UNITED STATES PATENT AND TRADEMARK OFFICE
CERTIFICATE OF CORRECTION

PATENT NO. : 4,402,481

DATED : September 6, 1983

INVENTOR(S) : Hiroshi Sasaki

It is certified that error appears in the above—identified patent and that said Letters Patent is hereby corrected as shown below:

Title page:

At [23] Filing Date, change "Feb. 5, 1980" to

--Feb. 5, 1982--.

Signed and Sealed this

Fourth Day of November, 1986

[SEAL]

Attest:

DONALD J. QUIGG

Attesting Officer

Commissioner of Patents and Trademarks